(12) United States Patent
Fournier et al.

(10) Patent No.: US 8,151,732 B2
(45) Date of Patent: Apr. 10, 2012

(54) ANIMAL WASTE MANAGEMENT DEVICE

(76) Inventors: Curt R. Fournier, Linden, MI (US); Victoria D. Januszewski, Linden, MI (US)

( * ) Notice: Subject to any disclaimer, the term of this patent is extended or adjusted under 35 U.S.C. 154(b) by 1045 days.

(21) Appl. No.: 12/058,906

(22) Filed: Mar. 31, 2008

(65) Prior Publication Data
US 2009/0241849 A1 Oct. 1, 2009

(51) Int. Cl.
*A01K 29/00* (2006.01)
(52) U.S. Cl. .............................. 119/161; 4/661
(58) Field of Classification Search ............. 4/234, 300, 4/242.1, 322, 368, 15, 661; 119/161, 220; 277/322
See application file for complete search history.

(56) References Cited

U.S. PATENT DOCUMENTS

| | | | | |
|---|---|---|---|---|
| 1,863,682 A | * | 6/1932 | Alberts | 4/246.3 |
| 2,464,580 A | * | 3/1949 | Johnson | 119/161 |
| 3,734,057 A | * | 5/1973 | Lee et al. | 119/163 |
| 3,771,491 A | * | 11/1973 | Hunter | 119/163 |
| 4,117,555 A | * | 10/1978 | Dennis | 119/163 |
| 4,228,554 A | * | 10/1980 | Tumminaro | 119/161 |
| 4,432,498 A | * | 2/1984 | Clements | 241/21 |
| 4,709,426 A | * | 12/1987 | Godwin, Jr. | 4/300.3 |
| 5,070,820 A | | 12/1991 | Gorman | |
| 5,271,105 A | * | 12/1993 | Tyler | 4/431 |
| 5,896,993 A | * | 4/1999 | Nask et al. | 206/508 |
| 5,963,994 A | * | 10/1999 | Harvey | 4/661 |
| 6,101,766 A | * | 8/2000 | Mogensen | 52/34 |
| 6,279,174 B1 | * | 8/2001 | Candusso | 4/224 |
| 6,453,844 B1 | | 9/2002 | Janzen et al. | |
| 6,590,146 B1 | * | 7/2003 | Mrsny | 84/420 |
| 6,792,628 B1 | | 9/2004 | Humphrey | |

FOREIGN PATENT DOCUMENTS

WO WO 0069247 A1 * 11/2000
* cited by examiner

*Primary Examiner* — Korie Chan
(74) *Attorney, Agent, or Firm* — John R. S. Orange; Blake, Cassels & Graydon LLP

(57) ABSTRACT

A pet waste management device includes a housing having upper and lower ends. The device includes a receiving bowl positioned in the housing, the bowl having an open upper end and a lower end having an outlet. A cover is situated upwardly adjacent the bowl upper end. A water outlet is positioned adjacent the bowl upper end to introduce water into the bowl. A supply line provides water to the water outlet. The device includes a first foot pedal configured to selectively allow water from the supply line to enter the bowl through the water outlet. A drain line is operatively coupled to the bowl lower end to drain contents of the bowl. The device includes a heating unit to prevent water from freezing, the heating unit including a resistive heating element and a thermostat and is in electrical communication with a power source.

17 Claims, 4 Drawing Sheets

ANIMAL WASTE MANAGEMENT DEVICE

BACKGROUND OF THE INVENTION

This invention relates generally to outdoor waste collection devices, and, more particularly, to an animal waste management device that may be installed at a residential or commercial property for the collection and disposal of animal waste.

The accumulation of pet waste in a residential yard or upon a commercial property is undesirable. In addition to being messy or malodorous, pet waste contains infectious disease, contaminants, and bacteria that may be harmful to people, marine animals, and, in general, to all wildlife. Contaminants from pet waste pollute waterways, including lakes, oceans, rivers, and streams.

Various devices have been proposed in the art for assisting in the collection and disposal of pet waste. Although assumably effective for their intended purposes, some of the existing proposals merely provide for assistive ways to collect pet waste. Other proposals have proposed depositing waste into a municipal sanitation system but lack important features such as water assisted transport of waste into the sewer system and ensuing that the system does not freeze in cold weather.

Therefore, it would be desirable to have a pet waste management device that assists with the collection and disposal of pet waste. Further, it would be desirable to have a pet waste management system that utilizes water under pressure to transport waste into a municipal sewer system. In addition, it would be desirable to have a pet waste management device for outdoor use that prevents the unit from freezing under cold weather conditions.

SUMMARY OF THE INVENTION

Therefore, a pet waste management device according to the present invention includes a housing having upper and lower ends. The device includes a receiving bowl positioned in the housing, the bowl having an open upper end and a lower end having an outlet. A cover is situated upwardly adjacent the bowl upper end. A water outlet is positioned adjacent the bowl upper end to introduce water into the bowl. A supply line provides water to the water outlet. The device includes a first foot pedal configured to selectively allow water from the supply line to enter the bowl through the water outlet. A drain line is operatively coupled to the bowl lower end to drain contents of the bowl. The device includes a heating unit to prevent water and all unit components from freezing, the heating unit including a resistive heating element and a thermostat and being in electrical communication with a power source. The heating unit may be powered by a 110 volt electrical connection, battery, or solar power source.

Therefore, a general object of this invention is to provide a pet waste management device, for use outdoors for the collection and disposal of pet waste.

Another object of this invention is to provide a pet waste management device, as aforesaid, that includes a pressurized water assist unit for transporting pet waste from a collection bowl into an existing sewer.

Still another object of this invention is to provide a pet waste management device, as aforesaid, that includes foot pedals for activating the water assist unit and for opening a cover.

Yet another object of this invention is to provide a pet waste management device, as aforesaid, that includes a heating unit for preventing water and all components in the device from freezing in cold weather.

A further object of this invention is to provide a pet waste management device, as aforesaid, that includes an anti-bacterial agent in communication with a supply line.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 4b is an isolated view on an enlarged scale of the cover lift foot pedal taken from a portion of FIG. 4a, the foot pedal being shown in a non-depressed configuration;

FIG. 4c is an isolated view on an enlarged scale of the cover lift foot pedal taken from a portion of FIG. 4a, the foot pedal being shown in a depressed configuration;

DESCRIPTION OF THE PREFERRED EMBODIMENT

An animal waste management device will now be described in detail with reference to FIG. 1 through FIG. 4e of the accompanying drawings. More particularly, the animal waste management device 100 includes a housing 110 and a receiving bowl 120.

Figure 1:
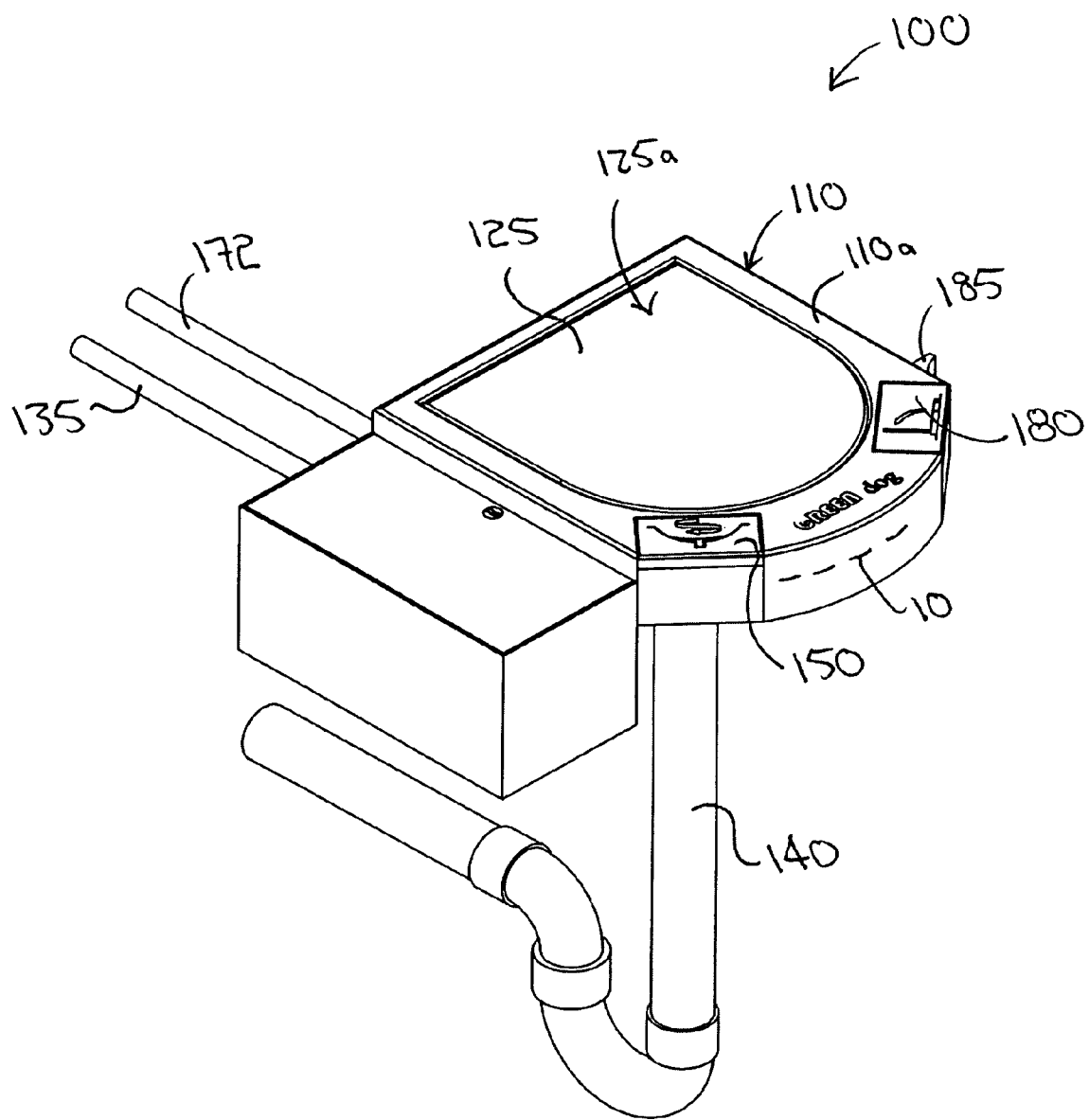
FIG. 1 is a perspective view of a pet waste management device according to a preferred embodiment of the present invention.

As shown in FIG. 1, the housing 110 is configured to have an upper end 110a that is generally adjacent a ground surface 10. In being generally adjacent to the ground surface 10, the upper end 110a may or may not be flush with the ground surface 10. The housing 110 may be constructed of stainless steel, plastic, concrete, or any other appropriate material.

Figure 4A:
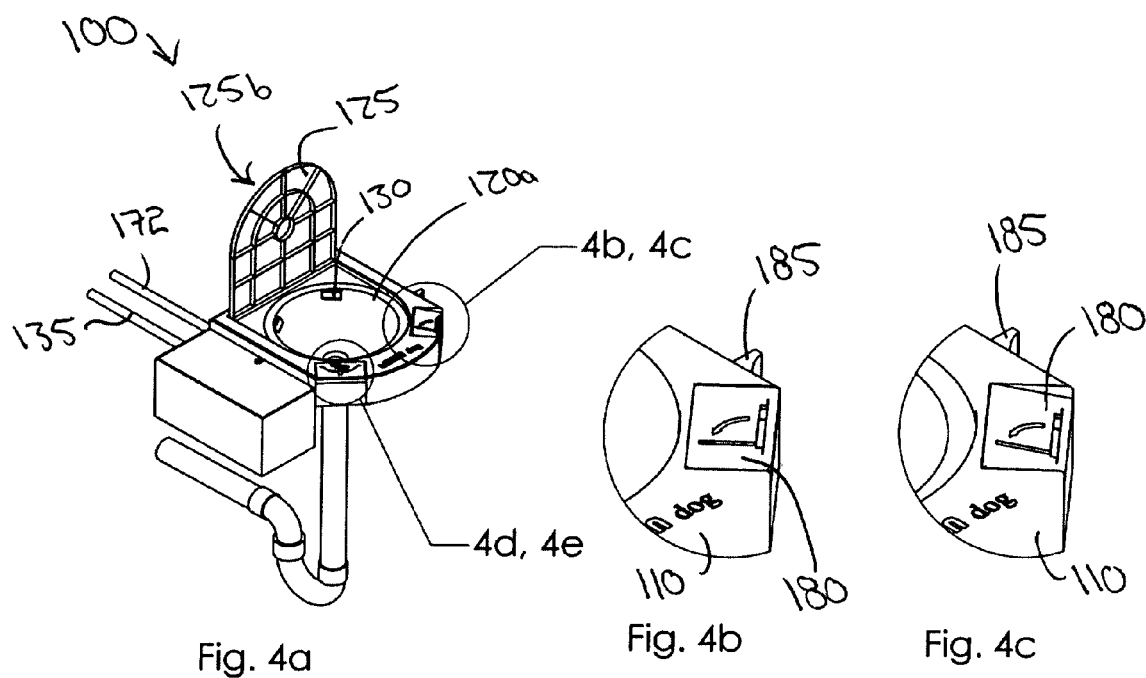
FIG. 4a is a perspective view of the pet waste management system as in FIG. 1.

The receiving bowl 120 has upper and lower ends 120a, 120b (FIG. 2) and is positioned in the housing 110 (FIG. 4a). The upper end 120a is open, and the lower end 120b has an outlet 121. The bowl 120 may be constructed of stainless steel, plastic, or any other appropriate material.

A cover 125 is upwardly adjacent the bowl 120 to selectively cover the bowl upper end 120a. The cover 125 may be movable between a lowered position 125a (FIG. 1) and a raised position 125b (FIG. 4a). Access to the bowl 120 (i.e., the bowl upper end 120a) may be restricted when the cover 125 is at the lowered position 125a (FIG. 1), and the bowl 120 may be accessed when the cover 125 is at the raised position 125b (FIG. 4a). The cover 125 may be a biased toward the raised position 125b due to a spring or other biasing element. When at the lowered position 125a, the cover 125 may seal watertight with the housing 110 and/or the bowl 120 so that drainage water and other materials cannot enter the bowl 120 when the cover 125 is at the lowered position 125a.

Figures 4D, 4E:
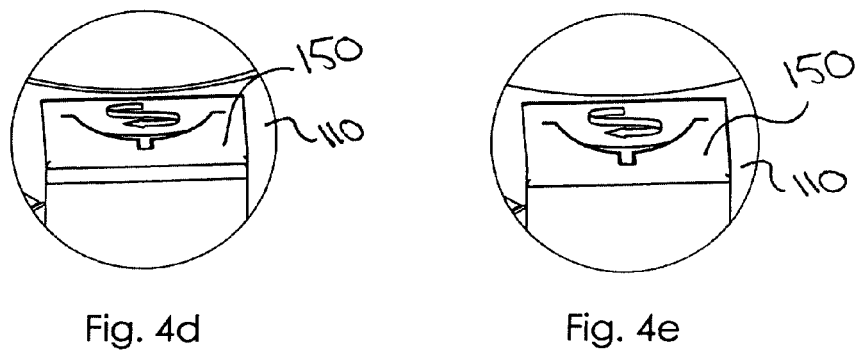
FIG. 4d is an isolated view on an enlarged scale of the water assist foot pedal taken from a portion of FIG. 4a, the foot pedal being shown in a non-depressed configuration.
FIG. 4e is an isolated view on an enlarged scale of the water assist foot pedal taken from a portion of FIG. 4a, the foot pedal being shown in a depressed configuration.

A water outlet 130 is adjacent the bowl upper end 120a (FIG. 4a) to introduce water into the bowl 120, and a supply line 135 (FIG. 4a) is in communication with the water outlet 130 to provide water to the water outlet 130. A drain line 140 is operatively coupled to the bowl lower end 120b to drain contents of the bowl 120. A user input (e.g., foot pedal 150) is configured to selectively allow water from the supply line 135 to enter the bowl 120 through the water outlet 130. As shown in FIGS. 4d and 4e, the foot pedal 150 may be a resilient pedal that returns to an original configuration (FIG. 4d) after being actuated (FIG. 4e) due to a spring or other biasing element.

A pressure-assist unit 160 (FIG. 2) may be in communication with the supply line 135 and the water outlet 130 to increase pressure of water obtained from the supply line 135 and selectively provide the water having increased pressure to the water outlet 130. As shown in FIG. 3, tubing 162 may operatively couple the pressure-assist unit 160 to the water outlet 130. The foot pedal 150 may be in communication with the pressure-assist unit 160 to selectively cause the pressure-assist unit 160 to provide the water having increased pressure to the water outlet 130. Various pressure-assist units 160 may be utilized. One such appropriate pressure-assist unit traps air as it fills with water and uses the pressure of the water supply line to compress the trapped air; the trapped air then increases the water pressure of the water exiting the unit. It is understood, however, that the unit may alternatively be implemented using a standard gravity feed water supply without the use of pressure.

Figure 2:
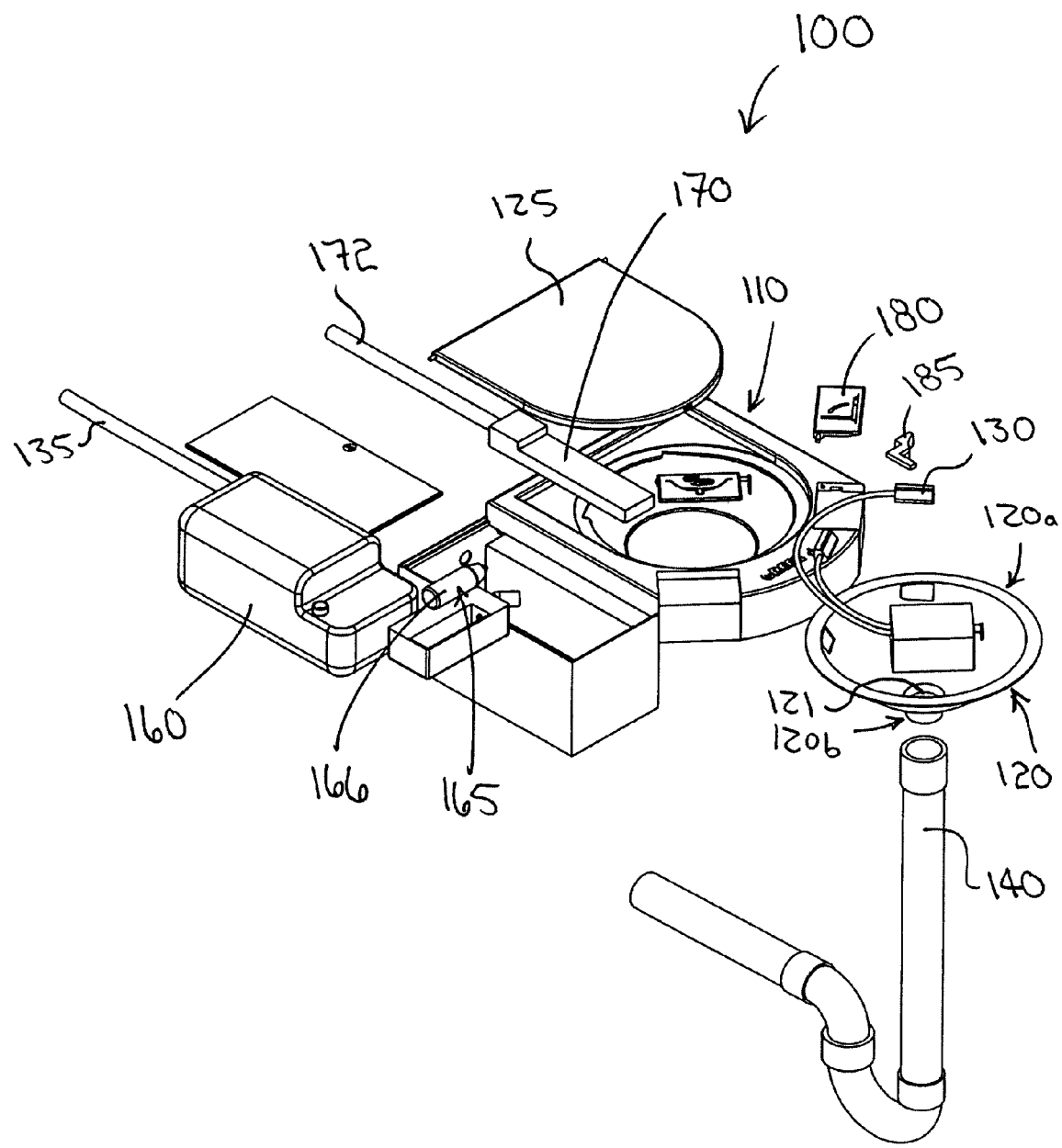
FIG. 2 is an exploded view of the pet waste management device as in FIG. 1.
Figure 3:
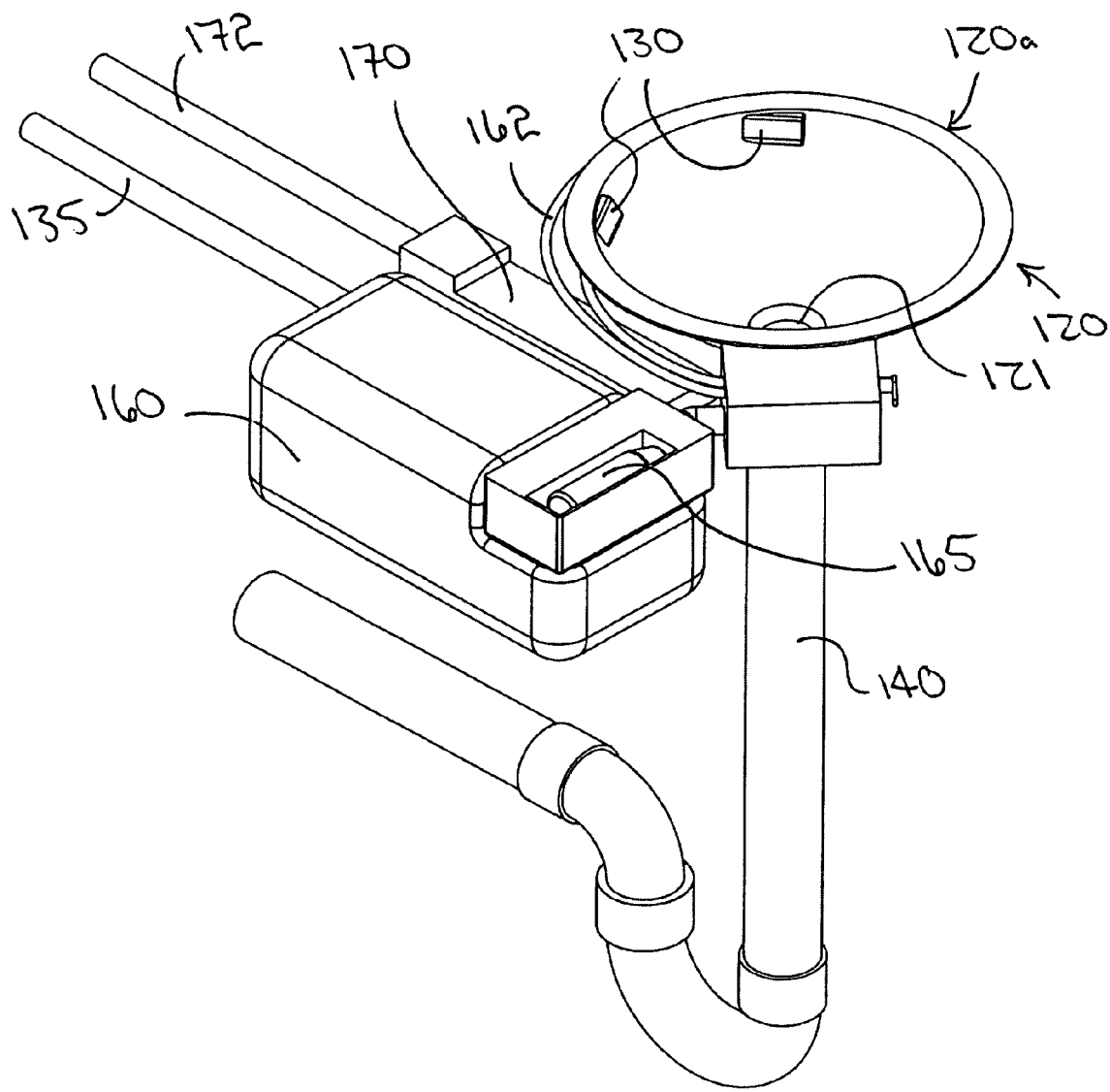
FIG. 3 is a perspective view of the pet waste management device as in FIG. 2 with the upper end of the housing and cover removed.

As shown in FIG. 2, an antibacterial agent 165 may be in communication with the supply line 135 (e.g., in communication with the pressure-assist unit 160) so that water passing from the supply line 135 to the water outlet 130 mixes with the antibacterial agent. The antibacterial agent 165 may be housed in a removable or replaceable cartridge 166 or may otherwise be in communication with the supply line 135.

A heating unit 170 may extend adjacent the pressure-assist unit 160, the supply line 135, and/or the tubing 162 to prevent water and other components from freezing, as shown in FIG. 3. The heating unit 170 may include a resistive heating element and a thermostat and may be in electrical communication with a power source. For example, electrical lines 172 may place the heating unit 170 in communication with an alternating current power source (e.g., a 10-volt power source), or the heating unit 170 may be in electrical communication with a battery. The heating unit 170 may also be connected to a solar power source (not shown).

As detailed in FIGS. 4b and 4c, a foot pedal 180 may be in communication with the cover 125 to selectively move the cover 125 from the lowered position 125a to the raised position 125b. The foot pedal 180 may be a resilient pedal that returns to an original configuration (FIG. 4b) after being actuated (FIG. 4c) due to a spring or other biasing element. A lock mechanism 185 (e.g., a foot-activated sliding pin) may restrict actuation of the foot pedal 180 so that the foot pedal 180 may only be actuated while the lock mechanism 185 is actuated. FIG. 4b shows the lock mechanism 185 restricting actuation of the foot pedal 180, and FIG. 4b shows the lock mechanism 185 allowing the foot pedal 180 to be actuated. The lock mechanism 185 may be biased to not allow the foot pedal 180 to be actuated, such as by a spring or other biasing element.

In use, the housing 110 may be installed so that the upper end 110 is generally adjacent the ground surface 10, the supply line 135 may be coupled to a well or public water supply line, and the drain line 140 may be coupled to a sewage system in accordance with applicable slope and plumbing requirements. Preferably, the drain line 140 is situated at approximately a 2% slope. To dispose of animal waste, a user may use one foot to release the lock mechanism 185 and another foot to press the foot pedal 180 (FIG. 4c), which causes the cover 125 to move to the raised position 125b (FIG. 4a). The waste may then be deposited in the bowl 120, and the user may actuate the foot pedal 150 to cause water to flow through the water outlet 130 and move the waste down the drain line 140 to the sewage system. The lock mechanism 185 may keep the pedal 180 from being accidentally actuated and may keep children from actuating the pedal 180.

If the pressure-assist unit 160 is included, actuating the foot pedal 150 may cause the pressure-assist unit 160 to provide the water having increased pressure to the water outlet 130. If the antibacterial agent 165 is included, water mixed with the antibacterial agent 165 may pass through the water outlet 130 to sanitize the bowl 120. Heating unit 170 may keep water in the pressure-assist unit 160, the supply line 135, the tubing 162, and other components from freezing in cold climates and/or winter months. The resilient nature of the pedals 150, 180 and the lock mechanism 185 may return those elements to their original configurations after they are moved by the user. If the cover 125 is biased toward the raised position 125b, the user may use his foot to return the cover 125 to the lowered position 125a.

The watertight seal between the cover 125 and the housing 110 and/or the bowl 120 when at the lowered position 125a may keep drainage water and other materials from entering the bowl 120 when the cover 125 is at the lowered position 125a. If desired, a backflow valve may be incorporated in the animal waste management device 100.

It is understood that while certain forms of this invention have been illustrated and described, it is not limited thereto except insofar as such limitations are included in the following claims and allowable functional equivalents thereof.

The invention claimed is:

1. An animal waste management device configured to be mounted substantially below a ground surface, comprising:
   a housing configured to have an upper end generally flush with the ground surface;
   a receiving bowl positioned in said housing, said bowl having upper and lower ends, said upper end being open, said lower end having an outlet;
   a cover upwardly adjacent said bowl to selectively cover said bowl upper end, said cover being movable between a lowered position restricting access to said bowl and a raised position allowing access to said bowl;
   a supply line;
   a water outlet adjacent said bowl upper end to introduce water into said bowl;
   a pressure-assist unit in communication with said supply line and said water outlet to increase pressure of water obtained from said supply line and selectively provide said water having increased pressure to said water outlet;
   a user input a first foot pedal in communication with said pressure-assist unit to selectively cause said pressure-assist unit to provide said water having increased pressure to said water outlet, said first foot pedal positioned adjacent said upper end and generally flush with the ground surface;
   a drain line operatively coupled to said bowl lower end to drain contents of said bowl; and
   a heating unit extending adjacent said supply line to prevent water from freezing, said heating unit including a resistive heating element and a thermostat and being in electrical communication with a power source.

2. The animal waste management device of claim 1, wherein tubing operatively couples said pressure-assist unit to said water outlet.

3. The animal waste management device of claim 2, further comprising an antibacterial agent in communication with said pressure-assist unit, wherein water passing from said pressure-assist unit to said water outlet mixes with said antibacterial agent.

4. The animal waste management device of claim 3, wherein:
- a second foot pedal adjacent said housing upper end is in communication with said cover that is configured to selectively move said cover from a lowered position to a raised position.

5. The animal waste management device of claim 4, wherein:
- a lock mechanism restricts actuation of said second foot pedal, whereby said second foot pedal may only be actuated while said lock mechanism is actuated, said lock mechanism being a foot-activated sliding pin;
- said lock mechanism is biased to not allow actuation of said second foot pedal;
- said first foot pedal is a resilient pedal that returns to an original configuration after being actuated;
- said second foot pedal is a resilient pedal that returns to an original configuration after being actuated;
- said cover is biased toward said raised position; and
- said cover seals watertight with at least one of said housing and said bowl when at said lowered position.

6. The animal waste management device of claim 1, further comprising an antibacterial agent in communication with said pressure-assist unit, wherein water passing from said pressure-assist unit to said water outlet mixes with said antibacterial agent.

7. The animal waste management device of claim 1, wherein:
- a second foot pedal is situated adjacent said housing upper end and in communication with said cover and is configured to move said cover from a lowered position to a raised position.

8. An animal waste management device configured to be mounted substantially below a ground surface, comprising:
- a housing configured to have an upper end generally flush with a ground surface;
- a receiving bowl positioned in said housing, said bowl having upper and lower ends, said upper end being open, said lower end having an outlet;
- a cover upwardly adjacent said bowl to selectively cover said bowl upper end, said cover being movable between a lowered position restricting access to said bowl and a raised position allowing access to said bowl;
- a water outlet adjacent said bowl upper end to introduce water into said bowl;
- a supply line to provide water to said water outlet;
- a first foot pedal adjacent said bowl upper end and generally flush with the ground surface, said first foot pedal configured to selectively allow water from said supply line to enter said bowl through said water outlet;
- a drain line operatively coupled to said bowl lower end to drain contents of said bowl;
- a pressure-assist unit in communication with said supply line and said water outlet to increase pressure of water obtained from said supply line and selectively provide said water having increased pressure to said water outlet; and wherein said first foot pedal is in communication with said pressure-assist unit to selectively cause said pressure-assist unit to provide said water having increased pressure to said water outlet; and
- a second foot pedal adjacent said bowl upper end and generally flush with the ground surface, said second foot pedal in communication with said cover to selectively move said cover from said lowered position to said raised position.

9. The animal waste management device of claim 8, further comprising a heating unit extending adjacent said supply line to prevent water from freezing, said heating unit including a resistive heating element and a thermostat and being in electrical communication with a power source.

10. The animal waste management device of claim 9, further comprising an antibacterial agent in communication with said supply line wherein water passing from said supply line to said water outlet mixes with said antibacterial agent.

11. The animal waste management device of claim 10, wherein:
- a lock mechanism restricts actuation of said second foot pedal, whereby said second foot pedal may only be actuated while said lock mechanism is actuated;
- said lock mechanism is biased to not allow actuation of said second foot pedal;
- said first foot pedal is a resilient pedal that returns to an original configuration after being actuated;
- said second foot pedal is a resilient pedal that returns to an original configuration after being actuated;
- said cover is a biased toward said raised position; and
- said cover includes a watertight seal with at least one of said housing and said bowl when at said lowered position.

12. The animal waste management device of claim 8, further comprising an antibacterial agent in communication with said supply line wherein water passing from said supply line to said water outlet mixes with said antibacterial agent.

13. An animal waste management device configured to mount substantially beneath a ground surface, comprising:
- a housing configured to have an upper end generally adjacent to and flush with a ground surface;
- a receiving bowl positioned in said housing, said bowl having upper and lower ends, said upper end being open, said lower end having an outlet;
- a cover upwardly adjacent said bowl to selectively cover said bowl upper end, said cover being movable between a lowered position restricting access to said bowl and a raised position allowing access to said bowl;
- a water outlet adjacent said bowl upper end to introduce water into said bowl;
- a supply line to provide water to said water outlet;
- a first foot pedal positioned adjacent said bowl upper end and flush with the ground surface, said first foot pedal being configured to selectively allow water from said supply line to enter said bowl through said water outlet when actuated;
- a drain line operatively coupled to said bowl lower end to drain contents of said bowl;
- a second foot pedal adjacent said bowl upper end and generally flush with the ground surface, said second foot pedal in communication with said cover to selectively move said cover from said lowered position to said raised position;
- a heating unit extending adjacent said supply line to prevent water from freezing when actuated, said heating unit including a resistive heating element and a thermostat and being in electrical communication with a power source;

a pressure-assist unit in communication with said supply line and said water outlet to increase pressure of water obtained from said supply line and selectively provide said water having increased pressure to said water outlet; and wherein said first foot pedal is in communication with said pressure-assist unit to selectively cause said pressure-assist unit to provide said water having increased pressure to said water outlet.

14. The animal waste management device of claim 13, further comprising an antibacterial agent in communication with said supply line wherein water passing from said supply line to said water outlet mixes with said antibacterial agent.

15. The animal waste management device of claim 14, wherein:
   said first foot pedal is a resilient pedal that returns to an original configuration after being actuated; and
   said cover seals watertight with at least one of said housing and said bowl when at said lowered position.

16. The animal waste management device of claim 13, wherein:
   a lock mechanism restricts actuation of said second foot pedal, whereby said second foot pedal may only be actuated while said lock mechanism is actuated;
   said lock mechanism is biased to not allow actuation of said second foot pedal;
   said second foot pedal is a resilient pedal that returns to an original configuration after being actuated; and
   said cover is biased toward said raised position.

17. The animal waste management device of claim 16, further comprising an antibacterial agent in communication with said supply line wherein water passing from said supply line to said water outlet mixes with said antibacterial agent.

* * * * *